(12) United States Patent
Sakata et al.

(10) Patent No.: US 9,882,431 B2
(45) Date of Patent: Jan. 30, 2018

(54) WIRELESS POWER TRANSMITTER APPARATUS RECEIVING LOAD-MODULATED SIGNAL TRANSMITTED FROM WIRELESS POWER RECEIVER APPARATUS BY CHANGING POWER CONSUMPTION OF WIRELESS POWER RECEIVER APPARATUS

(71) Applicant: Panasonic Intellectual Property Management Co., Ltd., Osaka (JP)

(72) Inventors: Tsutomu Sakata, Osaka (JP); Hiroshi Kanno, Osaka (JP); Hideo Oosumi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 169 days.

(21) Appl. No.: 14/443,466

(22) PCT Filed: Apr. 14, 2014

(86) PCT No.: PCT/JP2014/002111
§ 371 (c)(1),
(2) Date: May 18, 2015

(87) PCT Pub. No.: WO2014/174790
PCT Pub. Date: Oct. 30, 2014

(65) Prior Publication Data
US 2016/0156229 A1 Jun. 2, 2016

(30) Foreign Application Priority Data
Apr. 23, 2013 (JP) ................. 2013-090256

(51) Int. Cl.
*H02J 50/10* (2016.01)
*H02J 17/00* (2006.01)
(Continued)

(52) U.S. Cl.
CPC .............. *H02J 50/10* (2016.02); *H02J 5/005* (2013.01); *H02J 17/00* (2013.01); *H02J 50/80* (2016.02);
(Continued)

(58) Field of Classification Search
CPC .. H02J 50/10; H02J 50/80; H02J 5/005; H02J 17/00; H04B 5/0037; H04B 5/0081
See application file for complete search history.

(56) References Cited

U.S. PATENT DOCUMENTS 7,642,848 B2 * 1/2010 Nakatani .............. H03G 1/0088
327/306
7,847,438 B2 12/2010 Jin et al.
(Continued)

FOREIGN PATENT DOCUMENTS

JP 2009-33955 2/2009
JP 2009-118587 5/2009
(Continued)

OTHER PUBLICATIONS

International Search Report dated Jul. 1, 2014 in International (PCT) Application No. PCT/JP2014/002111.
(Continued)

*Primary Examiner* — Jared Fureman
*Assistant Examiner* — Michael Warmflash
(74) *Attorney, Agent, or Firm* — Wenderoth, Lind & Ponack, L.L.P.

(57) ABSTRACT

A wireless power transmitter apparatus is provided with: a power transmitter circuit having input terminals to which a DC power is inputted and output terminals from which the power transmitter circuit outputs the AC power and which supply the AC power to a power transmitting coil; a DC monitor circuit that monitors the DC power at the input terminals of the power transmitter circuit, and outputs a DC
(Continued)

monitor signal indicating a change in a characteristic associated with the DC power; and a demodulator circuit that detects a load-modulated signal based on the DC monitor signal, demodulates the load-modulated signal, and outputs a first demodulated signal. The load-modulated signal is transmitted from the wireless power receiver apparatus to the wireless power transmitter apparatus by changing power consumption of the wireless power receiver apparatus.

7 Claims, 10 Drawing Sheets

(51) Int. Cl.
    *H02J 5/00*     (2016.01)
    *H04B 5/00*     (2006.01)
    *H02J 50/80*     (2016.01)

(52) U.S. Cl.
    CPC ......... *H04B 5/0037* (2013.01); *H04B 5/0081* (2013.01)

(56) References Cited

U.S. PATENT DOCUMENTS

| | | | | |
|---|---|---|---|---|
| 7,990,221 | B2* | 8/2011 | Koizumi | H04B 1/04 330/285 |
| 8,339,097 | B2 | 12/2012 | Kojima et al. | |
| 8,942,624 | B2* | 1/2015 | Singh | H04B 5/0037 307/104 |
| 2009/0009006 | A1* | 1/2009 | Jin | H02J 7/0011 307/104 |
| 2010/0084918 | A1* | 4/2010 | Fells | H02J 5/005 307/32 |
| 2010/0123430 | A1* | 5/2010 | Kojima | H02J 7/025 320/108 |
| 2011/0241783 | A1* | 10/2011 | Koizumi | H04B 1/04 330/296 |
| 2013/0020879 | A1* | 1/2013 | Kihara | H02J 5/005 307/104 |
| 2013/0147279 | A1* | 6/2013 | Muratov | H02J 5/005 307/104 |
| 2013/0260676 | A1* | 10/2013 | Singh | H04B 5/0037 455/41.1 |
| 2014/0008990 | A1* | 1/2014 | Yoon | H02J 5/005 307/104 |
| 2014/0266019 | A1* | 9/2014 | Pigott | H02J 7/025 320/108 |

FOREIGN PATENT DOCUMENTS

| | | |
|---|---|---|
| JP | 2010-119251 | 5/2010 |
| JP | 2011-211779 | 10/2011 |
| WO | 2013/042570 | 3/2013 |

OTHER PUBLICATIONS

English translations of the International Preliminary Report on Patentability and the Written Opinion of the International Searching Authority dated Nov. 5, 2015 in International (PCT) Application No. PCT/JP2014/002111.

* cited by examiner

WIRELESS POWER TRANSMITTER APPARATUS RECEIVING LOAD-MODULATED SIGNAL TRANSMITTED FROM WIRELESS POWER RECEIVER APPARATUS BY CHANGING POWER CONSUMPTION OF WIRELESS POWER RECEIVER APPARATUS

TECHNICAL FIELD

The present disclosure relates to a wireless power transmitter apparatus of a wireless power supply system, that transmits power from the wireless power transmitter apparatus to a wireless power receiver apparatus in a noncontact manner, and the wireless power transmitter apparatus receives and demodulates a load-modulated signal sent from the wireless power receiver apparatus by changing power consumption of the wireless power receiver apparatus. The present disclosure also relates to the wireless power supply system including such a wireless power transmitter apparatus and a wireless power receiver apparatus.

BACKGROUND ART

In recent years, wireless power supply systems for charging battery-equipped devices or for supplying power to mobile devices, such as a tablet terminal, by utilizing electromagnetic induction between coils, are more and more widely used. In such a wireless power supply system, the wireless power receiver apparatus may request the wireless power transmitter apparatus to increase or decrease the amount of power to be supplied, or the like. Therefore, the wireless power receiver apparatus communicates to the wireless power transmitter apparatus using the load modulation scheme in which the wireless power receiver apparatus changes the magnitude of a load (e.g., power consumption of the wireless power receiver apparatus, which is variable by changing a load resistance), for example, by a switch device provided in the wireless power receiver apparatus, and notifies the wireless power transmitter apparatus of a change in the load.

For example, the power transmitter apparatus disclosed in the Patent Document 1 is known as a wireless power transmitter apparatus using the load modulation scheme. The power transmitter apparatus of the Patent Document 1 is a power transmitter apparatus characterized by detecting an electrical potential at one end of a power transmitting coil, limiting the detected electrical potential to be equal to or larger than a ground potential, and thus, extracting and demodulating a signal sent from a power receiver apparatus to the power transmitter apparatus. In the wireless power supply systems, it is necessary for safe power supply to maintain such a state that the power transmitter apparatus can receive signals from the power receiver apparatus and always demodulate the signals correctly.

CITATION LIST

Patent Documents

PATENT DOCUMENT 1: Japanese Patent laid-open Publication No. 2011-211779

SUMMARY OF INVENTION

Technical Problem

However, there is a possibility that the conventional wireless power transmitter apparatus can not stably extract a signal sent from a wireless power receiver apparatus to the wireless power transmitter apparatus using load modulation (load-modulated signal), and a bit error rate increases. For example, since the power transmitter apparatus of the Patent Document 1 uses the method of monitoring the electrical potential at one end of the power transmitting coil, there is such a problem that the power transmitter apparatus can not stably extract the signal, and a bit error rate increases. Therefore, in order to reduce the bit error rate and increase a packet read rate in the power transmitter apparatus of the Patent Document 1, it is necessary to increase a change in the electrical potential at one end of the power transmitting coil to achieve a degree of modulation at a certain level or more. However, in the load modulation scheme, the modulation is done by causing a current to flow through a path in the wireless power receiver apparatus, the path being different from a true load, and thus, increasing an apparent load. Therefore, there is such a problem that the increased degree of modulation leads to an increased loss, and it results in a reduced power transmission efficiency of the entire system.

An object of the present disclosure is to solve the aforementioned problems, and provide a wireless power transmitter apparatus capable of stably receiving packets without reducing the power transmission efficiency. Moreover, an object of the present disclosure is to provide a wireless power supply system including such a wireless power transmitter apparatus.

Solution to Problem

A wireless power transmitter apparatus of an aspect of the present disclosure is a wireless power transmitter apparatus of a wireless power supply system. The wireless power supply system includes the wireless power transmitter apparatus and a wireless power receiver apparatus. The wireless power transmitter apparatus includes a power transmitting coil. The wireless power receiver apparatus includes a power receiving coil and receives an AC power transmitted from the wireless power transmitter apparatus by electromagnetically coupling the power transmitting coil with the power receiving coil. The wireless power transmitter apparatus is provide with: an inverter circuit having input terminals to which a DC power is inputted and output terminals from which the inverter circuit outputs the AC power and which supply the AC power to the power transmitting coil; a DC monitor circuit that monitors the DC power at the input terminals of the inverter circuit, and outputs a DC monitor signal indicating a change in a characteristic associated with the DC power; and a first demodulator circuit that detects a load-modulated signal based on the DC monitor signal, demodulates the load-modulated signal, and outputs a first demodulated signal, the load-modulated signal being transmitted from the wireless power receiver apparatus to the wireless power transmitter apparatus by changing power consumption of the wireless power receiver apparatus.

Advantageous Effects of Invention

According to the power transmitter apparatus of the present disclosure, it is possible to provide the wireless power transmitter apparatus capable of stably receiving the load-modulated signals transmitted from the wireless power receiver apparatus, with a few errors. According to the present disclosure, a wireless power supply system having such a power transmitter apparatus can be provided.

DESCRIPTION OF EMBODIMENTS

Hereinafter, we will explain embodiments according to the present disclosure with reference to the drawings. In each of the following embodiments, like constituent elements are denoted by the same reference signs. It is noted that the present disclosure is not limited to the following embodiments.

First Embodiment

Figure 1:
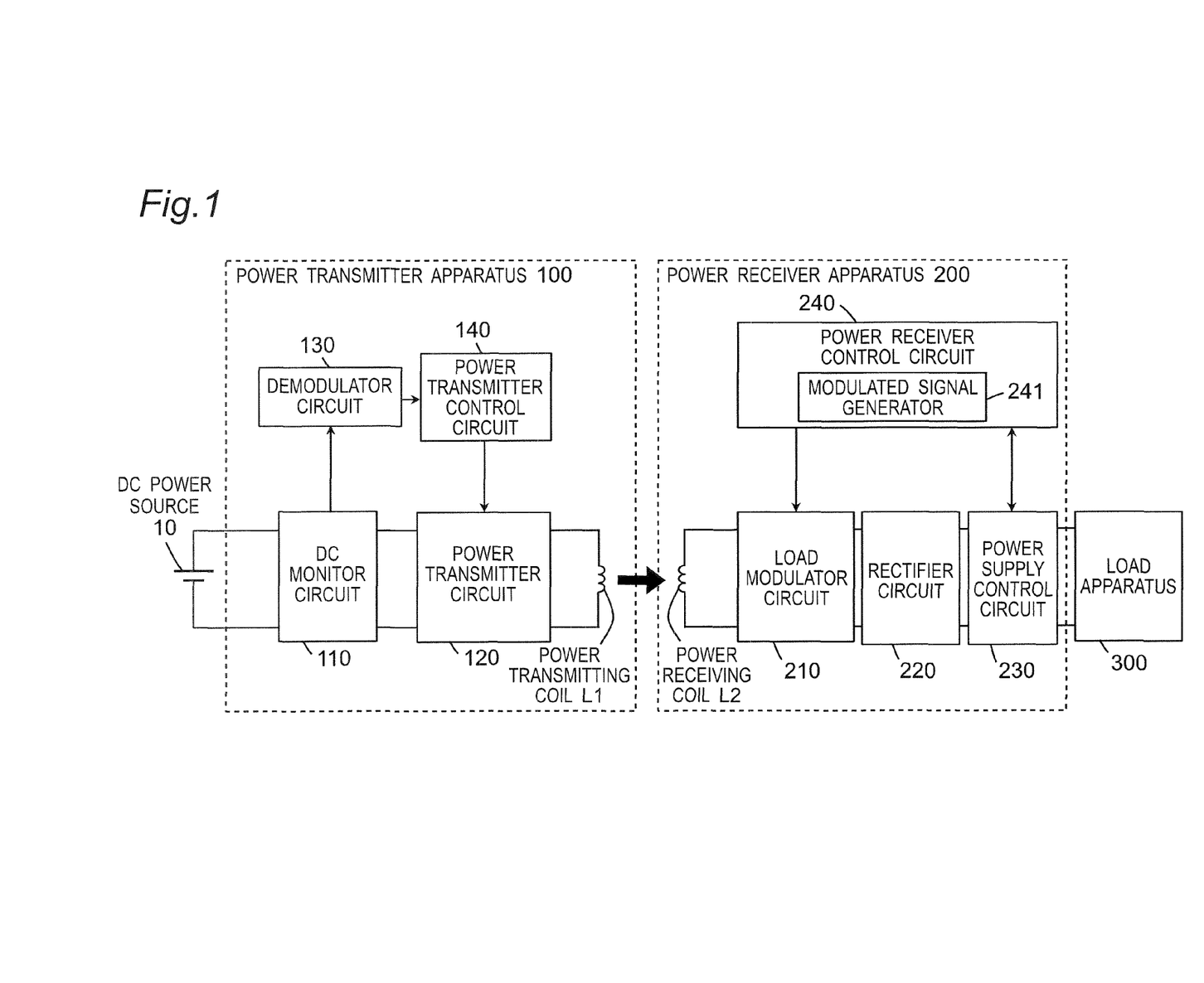
FIG. 1 is a block diagram showing a configuration of a wireless power supply system according to a first embodiment.

FIG. 1 is a block diagram showing a configuration of a wireless power supply system according to the first embodiment of the present disclosure. The wireless power supply system is constituted of a power transmitter apparatus 100 connected to a DC (direct current) power source 10, and a power receiver apparatus 200 connected to a load apparatus 300. In the wireless power supply system of FIG. 1, a load-modulated signal sent from the power receiver apparatus 200 to the power transmitter apparatus 100 is received by monitoring a DC power in a DC circuit part of the power transmitter apparatus 100.

The power transmitter apparatus 100 is provided with: a DC monitor circuit 110, a power transmitter circuit 120, a demodulator circuit 130, a power transmitter control circuit 140, and a power transmitting coil L1. The power transmitter circuit 120 includes an inverter circuit for converting a DC power into an AC (alternating current) power of a certain power transmitting frequency. Input terminals of the power transmitter circuit 120 are connected to the DC power source 10 through the DC monitor circuit 110, and a DC power is inputted from the DC power source 10. Output terminals of the power transmitter circuit 120 are connected to the power transmitting coil L1, and an AC power is outputted. The DC monitor circuit 110 monitors the DC power at the input terminals of the power transmitter circuit 120, and outputs a DC monitor signal indicating a change in a characteristic associated with the DC power, to the demodulator circuit 130. The DC monitor signal indicates, for example, a change in a current associated with the DC power. The demodulator circuit 130 detects and demodulates the load-modulated signal based on the DC monitor signal to outputs the demodulated signal, the load-modulated signal being sent from the power receiver apparatus 200 to the power transmitter apparatus 100 by changing the power consumption of the power receiver apparatus 200. The power transmitter control circuit 140 processes the demodulated signal, and controls the power transmitter circuit 120 according to its contents. If the power transmitter circuit 120 performs, for example, pulse width modulation (PWM), the power transmitter control circuit 140 controls the power transmitter circuit 120 so as to change the frequency and/or the duty cycle of PWM.

The power receiver apparatus 200 is provided with a power receiving coil L2, a load modulator circuit 210, a rectifier circuit 220, a power supply control circuit 230, and a power receiver control circuit 240. The power receiving coil L2 is electromagnetically coupled to the power transmitting coil L1 of the power transmitter apparatus 100, and receives the AC power transmitted from the power transmitter apparatus 100 through the power transmitting coil L1. The received AC power is sent to the rectifier circuit 220 through the load modulator circuit 210. A DC power rectified by the rectifier circuit 220 is sent to the load apparatus 300 through the power supply control circuit 230. The power receiver control circuit 240 obtains, for example, the amount of power consumption of the load apparatus 300, from the power supply control circuit 230, judges whether or not to supply the load apparatus 300 with the power received from the power transmitter apparatus, and controls the power supply control circuit 230. The power receiver control circuit 240 is provided with a modulated signal generator 241 for generating a signal requesting to, for example, increase or decrease the amount of power to be supplied, etc., based on the amount of power consumption of the load apparatus 300. This signal is, for example, a binary data packet. The load modulator circuit 210 generates a load-modulated signal by changing the power consumption of the power receiver apparatus 200 (i.e., AC power flowing through the power receiving coil L2) based on the signal generated by the modulated signal generator 241. The load-modulated signal is transmitted from the power receiver apparatus 200 to the power transmitter apparatus 100 through the power receiving coil L2 and the power transmitting coil L1.

Figure 2:
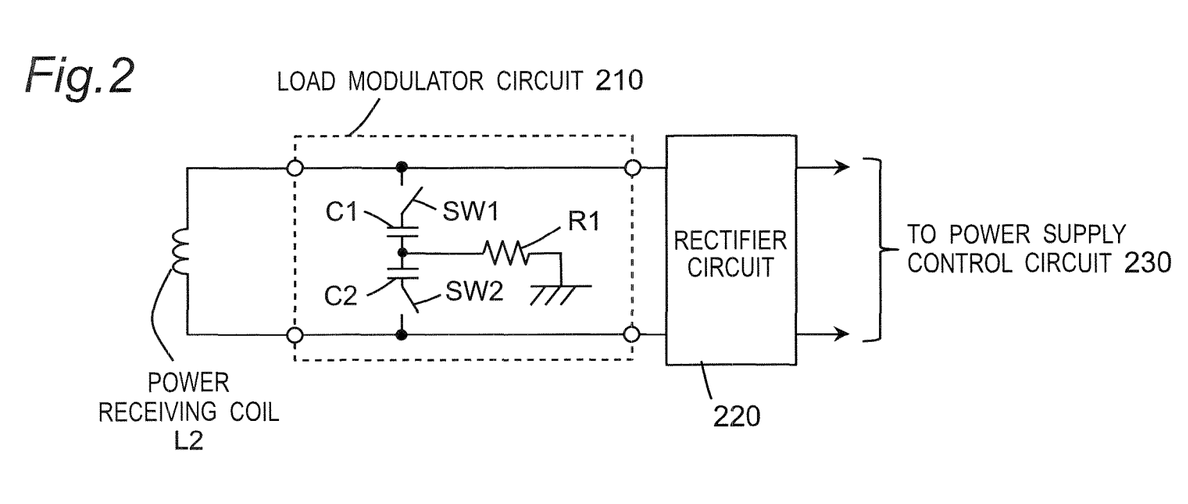
FIG. 2 is a circuit diagram showing a detailed configuration of a load modulator circuit 210 of FIG. 1.

FIG. 2 is a circuit diagram showing a detailed configuration of the load modulator circuit 210 of FIG. 1. The load modulator circuit 210 is provided with capacitors C1 and C2, switches SW1 and SW2, and a resistor R1. The load modulator circuit 210 turns on or off the switches SW1 and SW2 based on the signal generated by the modulated signal generator 241, and thus, opens or closes a path other than the load apparatus 300, through which a current flows. In such a manner, the load modulator circuit 210 changes the load resistance of the entire power receiver apparatus 200, and thus, changes the power consumption of the power receiver apparatus 200.

Figure 3:
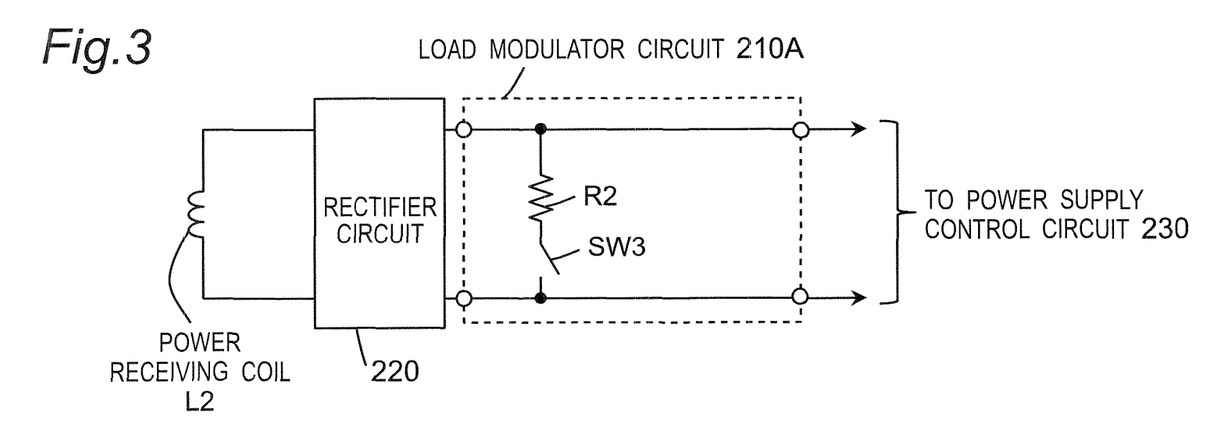
FIG. 3 is a circuit diagram showing a detailed configuration of a load modulator circuit 210A of a power receiver apparatus according to a first modified embodiment of the first embodiment.

FIG. 3 is a circuit diagram showing a detailed configuration of a load modulator circuit 210A of a power receiver apparatus according to a first modified embodiment of the first embodiment. Although the load modulator circuit 210 of FIGS. 1 and 2 precedes the rectifier circuit 220, the load modulator circuit may follow the rectifier circuit 220. The load modulator circuit 210A shown in FIG. 3, which follows the rectifier circuit 220, is provided with a resistor R2 and a switch SW3. The load modulator circuit 210A turns on or off the switch SW3 based on the signal generated by the modulated signal generator 241.

Figure 4:
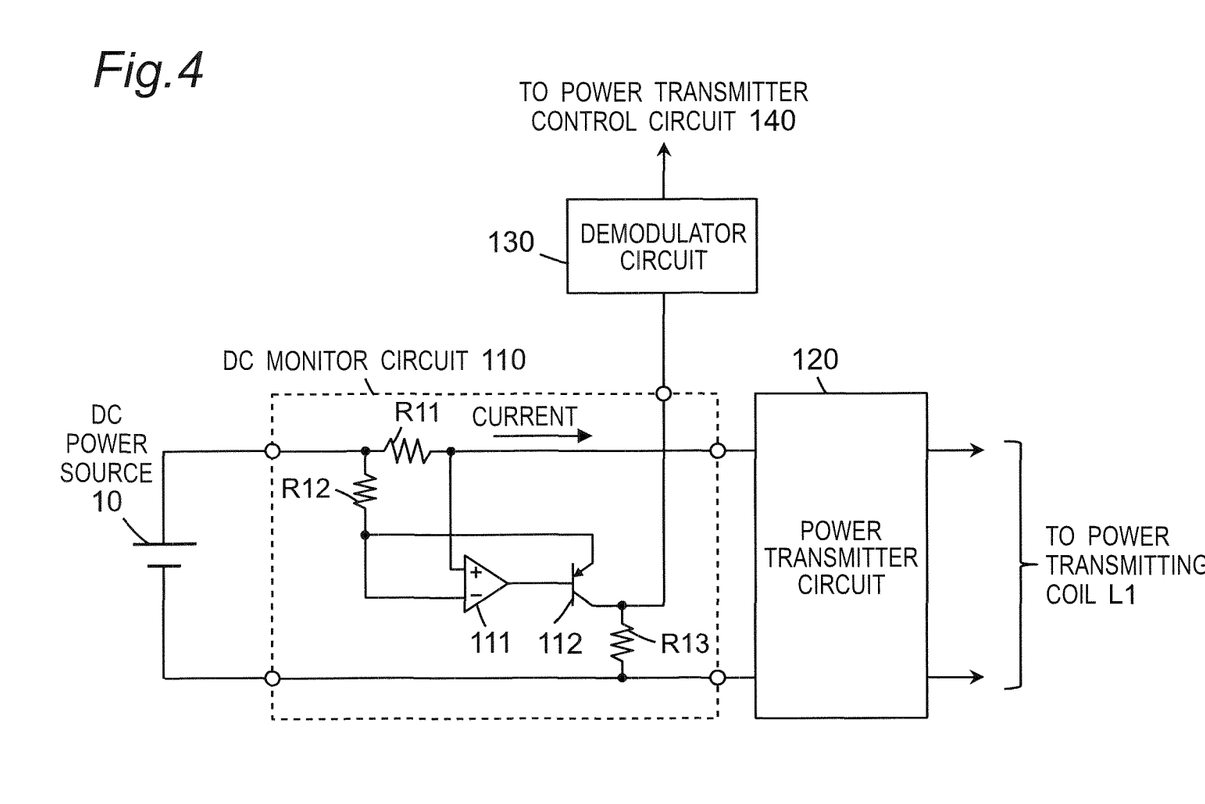
FIG. 4 is a circuit diagram showing a detailed configuration of a DC monitor circuit 110 of a power transmitter apparatus 100 of FIG. 1.

FIG. 4 is a circuit diagram showing a detailed configuration of the DC monitor circuit 110 of the power transmitter apparatus 100 of FIG. 1. The DC monitor circuit 110 is provided with: resistors R11 to R13, an amplifier 111, and a transistor 112. The resistor R11 has a small resistance, and is connected in series between the DC power source 10 and one input terminal of the power transmitter circuit 120. The DC monitor circuit 110 monitors a current flowing through the resistor R11 by measuring a voltage between both ends of the resistor R11. The amplifier 111 is a differential amplifier for amplifying a small voltage induced by the current flowing through the resistor R11. The amplified voltage is sent to the demodulator circuit 130 as the DC monitor signal.

By using the resistor R11 with a sufficiently small resistance so that the power consumed by the resistor R11 is equal to or smaller than 1/100 of the transmitting power, it is possible to reduce the power consumed at the resistor R11 and prevent reduction in the power transmission efficiency. Furthermore, since the voltage between both ends of the resistor R11 is amplified by the amplifier 111, it is possible to detect a change in the current associated with the DC power without being overwhelmed by noises. For example, when using a DC power source 10 of 16 V and a resistor R11 with a resistance of 10 mΩ, even if a current of 5 A flows through the DC monitor circuit 110 a power loss due to the resistor R11 is 0.05 W. The power loss is equal to or smaller than 1/100 of the transmitting power of 80 W, thus resulting in substantially no reduction in the power transmission efficiency.

Figure 5:
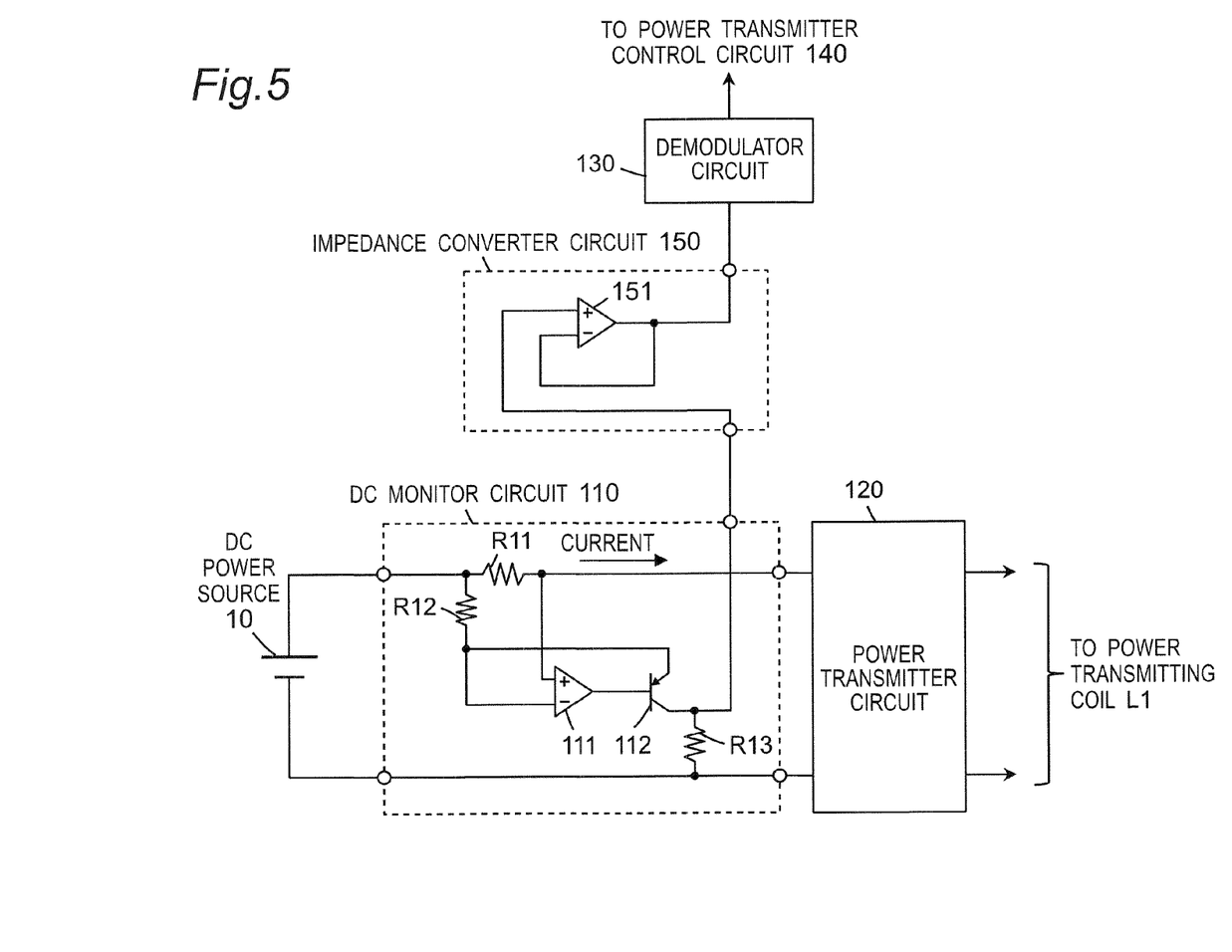
FIG. 5 is a circuit diagram showing a part of a configuration of a power transmitter apparatus provided with an impedance converter circuit 150 according to a second modified embodiment of the first embodiment.

FIG. 5 is a circuit diagram showing a part of a configuration of a power transmitter apparatus provided with an impedance converter circuit 150 according to a second modified embodiment of the first embodiment. The power transmitter apparatus of FIG. 5 is further provided with the impedance converter circuit 150 between the DC monitor circuit 110 and the demodulator circuit 130. The impedance converter circuit 150 is provided with an amplifier 151. In the case that the demodulator circuit 130 has a low input impedance, an impedance converter circuit 150 with a high input impedance is provided between the DC monitor circuit 110 and the demodulator circuit 130. With this arrangement, the DC monitor signal is not affected by the demodulator circuit 130, and thus, it is possible to prevent deterioration in the DC monitor signal. The impedance converter circuit 150 of FIG. 5 is configured as an impedance converter circuit using an amplifier with an amplification factor of one, which is called a voltage follower. However, impedance converter circuits of other circuit configurations may be used.

Now, we will explain the operation principle of the wireless power supply system of FIG. 1.

In the wireless power supply system using the load modulation scheme, if the power consumption of the power receiver apparatus 200 changes, then the AC power at the output terminals of the power transmitter apparatus 100 also changes through the power receiving coil L2 and the power transmitting coil L1. In this case, both the voltage and the current at the output terminals of the power transmitter apparatus 100 change. Which of the voltage and the current mainly changes depends on the state of the load apparatus 300, and the coupled state of the power transmitting coil L1 and the power receiving coil L2, etc.

In standard wireless communications using high frequency, power is used for making a high-frequency carrier wave carry a signal (information), and therefore, the signal appears only in an AC circuit part, and no signal appears on power lines in a DC circuit part. On the other hand, in the load modulation scheme used in the wireless power supply system, the transmitted power itself carries a signal, and therefore, the signal also appears on power lines in the DC circuit part of the power transmitter apparatus.

The power transmitter apparatus 100 of the present disclosure monitors not the AC power at the output terminals of the power transmitter circuit 120 (AC circuit part), but the DC power at the input terminals of the power transmitter circuit 120 (DC circuit part). Since the power transmitter circuit 120 is supplied with power from the DC power source 10, the voltage at the input terminals of the power transmitter circuit 120 is constant. Therefore, an influence due to the load-modulated signal sent from the power receiver apparatus 200 to the power transmitter apparatus 100 mainly appears as a change in the current at the input terminals of the power transmitter circuit 120. Therefore, by detecting the change in the current associated with the DC power at the input terminals of the power transmitter circuit 120, it is possible to stably receive the load-modulated signals with a few errors, without depending on the state of the load apparatus 300.

Since the power transmitter apparatus 100 of the present disclosure detects the change in the current associated with the DC power, it is not necessary to perform a filtering process for removing the AC components of the transmitting power from a monitor signal. The filtering process was needed when monitoring the AC power as disclosed in the Patent Document 1, and not a little deterioration occurred in the process of removing the AC components. On the other hand, by omitting the filtering process, it is possible to obtain a monitor signal with a reduced deterioration, reduce the bit error rate, and improve the packet read rate.

Figure 11:
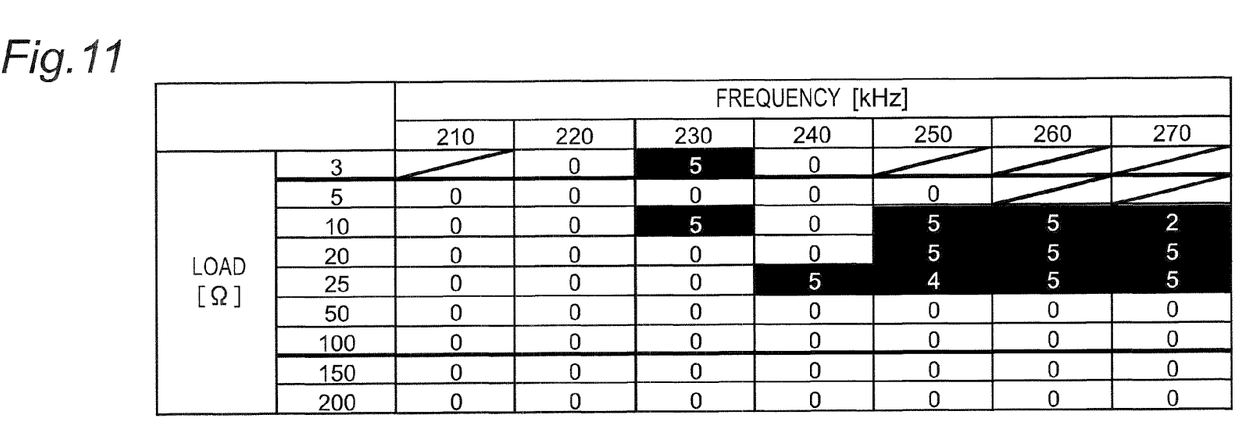
FIG. 11 is a table showing the frequency of error occurring in demodulated signals obtained from an AC power at output terminals of a power transmitter circuit 120.
Figure 12:
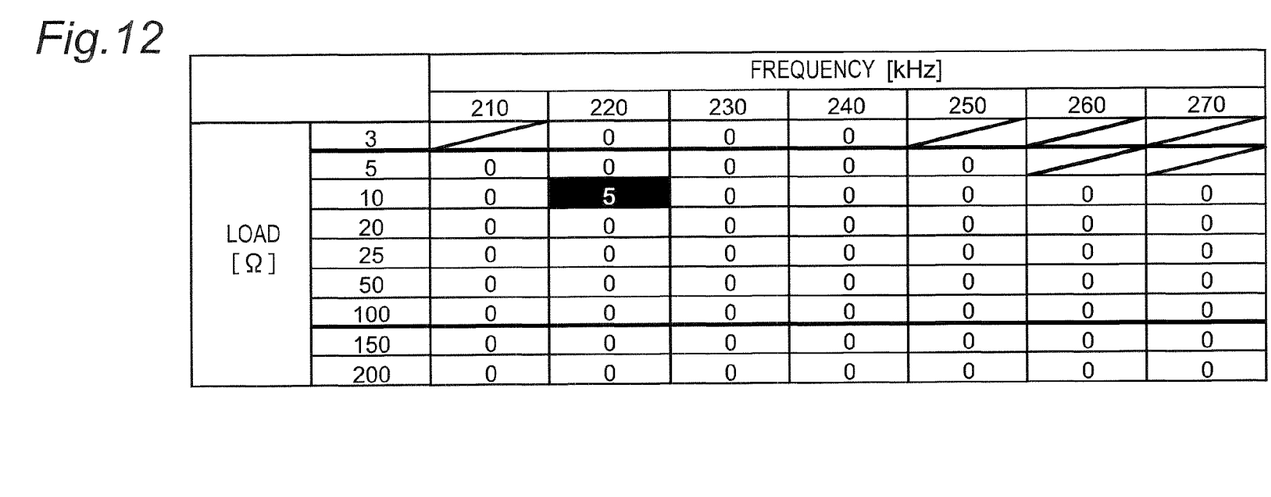
FIG. 12 is a table showing the frequency of error occurring in demodulated signals obtained from a DC power at input terminals of the power transmitter circuit 120.

Next, we will explain the advantageous effects of the power transmitter apparatus 100 of FIG. 1 with reference to FIGS. 11 and 12. At first, we will explain a comparison example of monitoring the AC power at the output terminals of the power transmitter circuit 120 of FIG. 1, instead of monitoring the DC power at the input terminals of the power transmitter circuit 120. FIG. 11 is a table showing the frequency of error occurrence in the demodulated signals obtained from the AC power at the output terminals of the power transmitter circuit 120. FIG. 11 shows, as an example, the frequency of error occurrence under the conditions that a load apparatus 300 with a resistance of 3 to 200Ω is connected, and a power transmitting frequency of 210 to 270 kHz is used. The frequency of error occurrence means a number of events, over a predetermined period, that a packet of the load-modulated signal from the power receiver apparatus 200 can not be correctly demodulated. On the other hand, FIG. 12 shows an implementation example in the case of monitoring the DC power at the input terminals of the power transmitter circuit 120 of FIG. 1. FIG. 12 is a table showing the frequency of error occurrence in the demodulated signals obtained from the DC power at the input terminals of the power transmitter circuit 120. The conditions of the load and the power transmitting frequency were the same as those of FIG. 11. In the comparison example of FIG. 11, there were many combinations of the load and the power transmitting frequency, under which the packets were not demodulated and errors occurred, and the packets were correctly demodulated under only 83% of all the combinations. On the other hand, in the implementation example of FIG. 12, the combinations of the load and the power transmitting frequency under which the errors occur were largely reduced, and the packets were successfully demodulated under 98% of all the combinations, thus improving the packet read rate. FIGS. 11 and 12 show exemplary values, and different power transmitting frequencies and different loads may be used for various applications.

As described above, according to the power transmitter apparatus 100 of FIG. 1, it is possible to stably receive the load-modulated signals sent from the power receiver apparatus 200, with a few errors.

Figure 6:
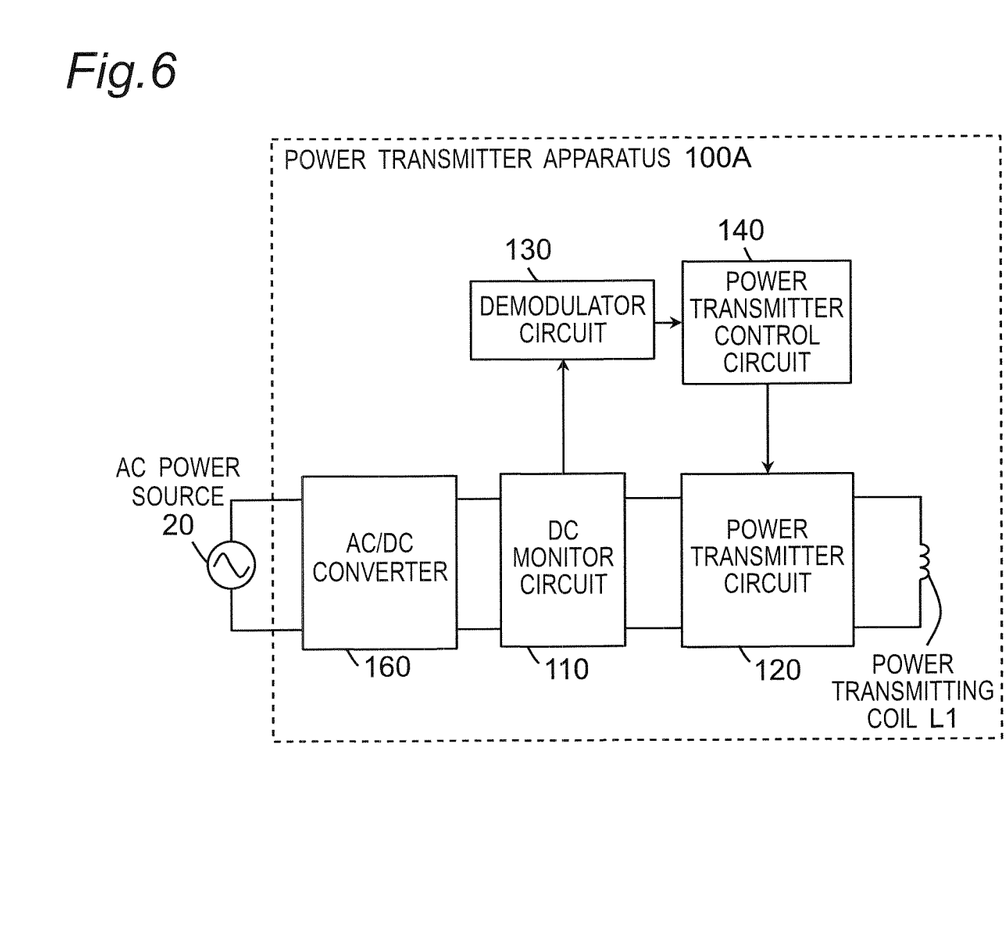
FIG. 6 is a block diagram showing a configuration of a power transmitter apparatus 100A according to a third modified embodiment of the first embodiment.

FIG. 6 is a block diagram showing a configuration of a power transmitter apparatus 100A according to a third modified embodiment of the first embodiment. The power transmitter apparatus 100A of FIG. 6 is supplied with power by a commercial AC power source 20. The power transmitter apparatus 100A is provided with an AC/DC converter 160 for converting an AC power supplied by the AC power source 20, into a DC power. The DC power outputted from the AC/DC converter 160 is inputted to a power transmitter circuit 120 through a DC monitor circuit 110. The DC monitor circuit 110 of FIG. 6 monitors the DC power at the input terminals of the power transmitter circuit 120, and outputs a DC monitor signal indicating a change in a characteristic associated with the DC power, to a demodulator circuit 130, as in a manner similar to that of the DC monitor circuit 110 of FIG. 1. Regardless of using the DC power source 10 of FIG. 1 or the AC power source 20 of FIG. 6, it is possible stably receive the load-modulated signals sent from the power receiver apparatus to the power transmitter apparatus, with a few errors, by monitoring the DC power at the input terminals of the power transmitter circuit 120.

Second Embodiment

As described with reference to FIGS. 11 and 12, according to the power transmitter apparatus 100 of FIG. 1, it is possible to stably receive the load-modulated signals sent from the power receiver apparatus to the power transmitter apparatus, with a few errors. However, according to FIG. 12, even the power transmitter apparatus 100 of FIG. 1 can not completely avoid errors. Accordingly, in order to solve this problem, a power transmitter apparatus 100B according to the second embodiment monitors both the DC power at the input terminals of the power transmitter circuit 120, and the AC power at the output terminals of the power transmitter circuit 120.

Figure 7:
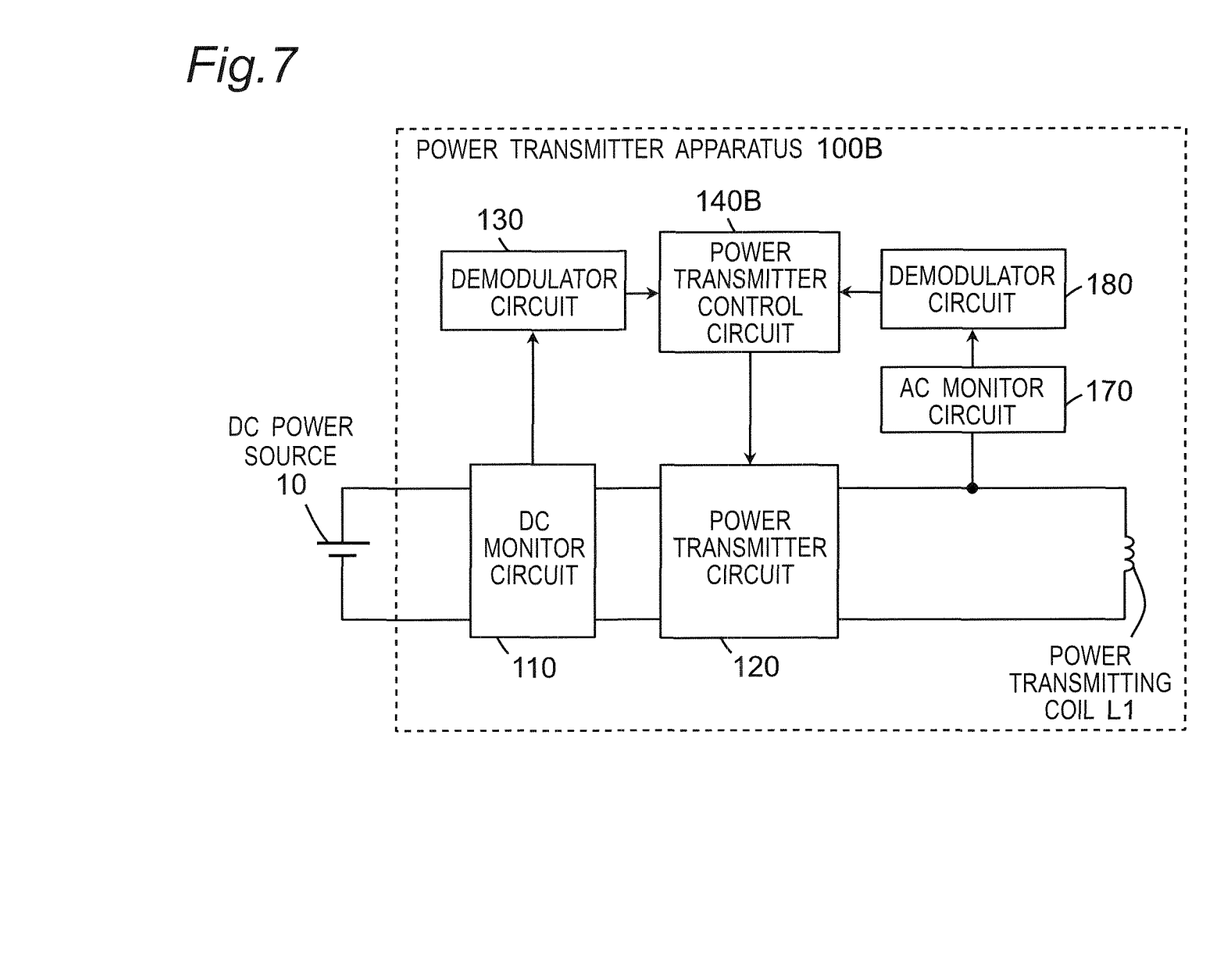
FIG. 7 is a block diagram showing a configuration of a power transmitter apparatus 100B according to a second embodiment.

FIG. 7 is a block diagram showing a configuration of the power transmitter apparatus 100B of the second embodiment. The power transmitter apparatus 100B is provided with an AC monitor circuit 170 and a demodulator circuit 180 in addition to the constituent elements of the power transmitter apparatus 100 of FIG. 1, and is provided with a power transmitter control circuit 140B instead of the power transmitter control circuit 140 of FIG. 1. The AC monitor circuit 170 monitors the AC power at the output terminals of the power transmitter circuit 120, and outputs an AC monitor signal indicating a change in a characteristic associated with the AC power. The demodulator circuit 180 detects and demodulates a load-modulated signal based on the AC monitor signal to output a second demodulated signal. The power transmitter control circuit 140B executes a demodulated signal selecting process of FIG. 8, to judge whether or not at least one of the first and second demodulated signals is correctly demodulated, and select one of the demodulated signals which is correctly demodulated. The AC monitor circuit 170 outputs, for example, a voltage which is half-wave rectified through a diode and divided through voltage-divider resistors, as an AC monitor signal, as disclosed in the Patent Document 1.

An impedance converter circuit may be provided between the DC monitor circuit 110 and the demodulator circuit 130. In addition, an impedance converter circuit may also be provided between the AC monitor circuit 170 and the demodulator circuit 180.

Figure 8:
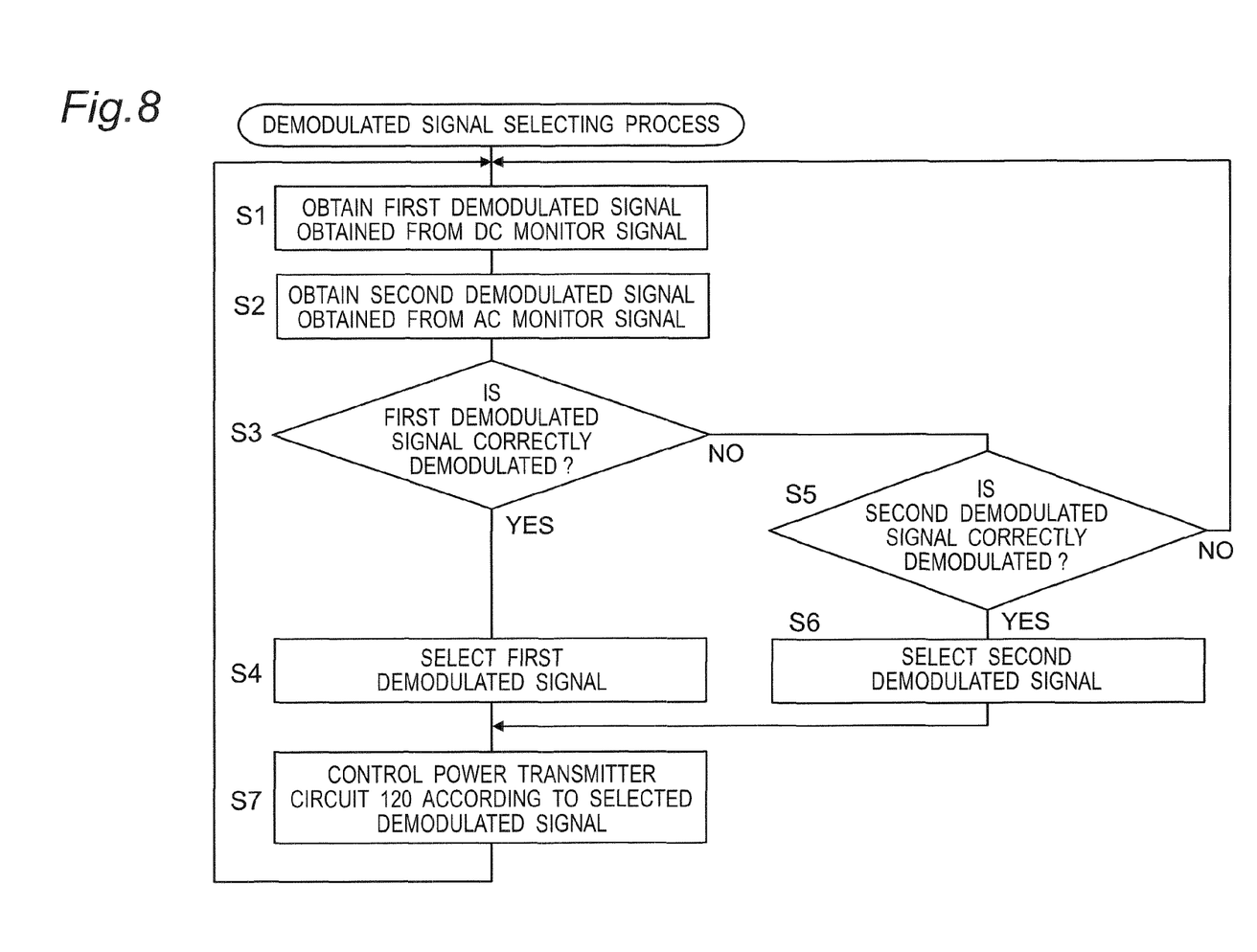
FIG. 8 is a flow chart of a demodulated signal selecting process executed by a power transmitter control circuit 140B of FIG. 7.

FIG. 8 is a flow chart of the demodulated signal selecting process executed by the power transmitter control circuit 140B of FIG. 7. In step S1, the power transmitter control circuit 140B obtains the first demodulated signal obtained from the DC monitor signal by the DC monitor circuit 110 and the demodulator circuit 130. In step S2, the power transmitter control circuit 140B obtains the second demodulated signal obtained from the AC monitor signal by the AC monitor circuit 170 and the demodulator circuit 180. In step S3, the power transmitter control circuit 140B judges whether or not the first demodulated signal is correctly demodulated. If YES, the process proceeds to step S4, and in step S4, the power transmitter control circuit 140B selects the first demodulated signal; if NO, the process proceeds to step S5. In step S5, the power transmitter control circuit 140B judges whether or not the second demodulated signal is correctly demodulated. If YES, the process proceeds to step S6, and in step S6, the power transmitter control circuit 140B selects the second demodulated signal; if NO, the process returns to step S1, and in step S1, the power transmitter control circuit 140B waits for the next load-modulated signal. In step S7 subsequent to steps S4 and S6, the power transmitter control circuit 140B controls the power transmitter circuit 120 according to the selected demodulated signal. It is possible to judge whether or not the demodulated signal is correctly demodulated, by evaluating a checksum signal of the demodulated signal conforming to a predetermined rule.

In the flow chart of FIG. 8, it is firstly judged whether or not the first demodulated signal obtained from the DC monitor signal is correctly demodulated. It may be firstly judged for the second demodulated signal obtained from the AC monitor signal.

According to the power transmitter apparatus 100B of FIG. 7, it is possible to monitor both the DC power and the AC power, and use the one whose demodulated signal is correctly demodulated. According to FIGS. 11 and 12, even under a combination of a load and a power transmitting frequency under which the demodulated signal obtained from the DC power is not correctly demodulated, the demodulated signal obtained from the AC power may be successfully demodulated. Therefore, according to the power transmitter apparatus 100B of FIG. 7, it is possible to more stably receive the load-modulated signals with fewer errors than those of the power transmitter apparatus 100 of FIG. 1.

Although in the above description the AC monitor circuit 170 outputs the AC monitor signal indicating the change in the voltage associated with the AC power at the output terminals of the power transmitter circuit 120, the AC monitor circuit 170 may output the AC monitor signal indicating a change in a current associated with this AC power. In addition, the AC monitor circuit 170 may output a first AC monitor signal indicating the change in the voltage associated with the AC power at the output terminals of the power transmitter circuit 120, and a second AC monitor signal indicating the change in the current associated with this AC power. In this case, the power transmitter control circuit 140B may judge whether or not at least one of a first demodulated signal obtained from the DC monitor signal, a second demodulated signal obtained from the first AC monitor signal, and a third demodulated signal obtained from the second AC monitor signal is correctly demodulated, and select one of the demodulated signals which is correctly demodulated.

Third Embodiment

The power transmitter apparatus 100B of FIG. 7 also demodulates one of the DC monitor signal and the AC monitor signal, which is not used for controlling the power transmitter circuit 120 because of errors therein, using the corresponding demodulator circuit. The demodulator circuit for performing this extra demodulation increases the circuit size. Accordingly, in order to solve this problem, a power transmitter apparatus 100C according to the third embodiment uses a switch SW11 to select which of the DC monitor signal and the AC monitor signal is inputted to the demodulator circuit.

Figure 9:
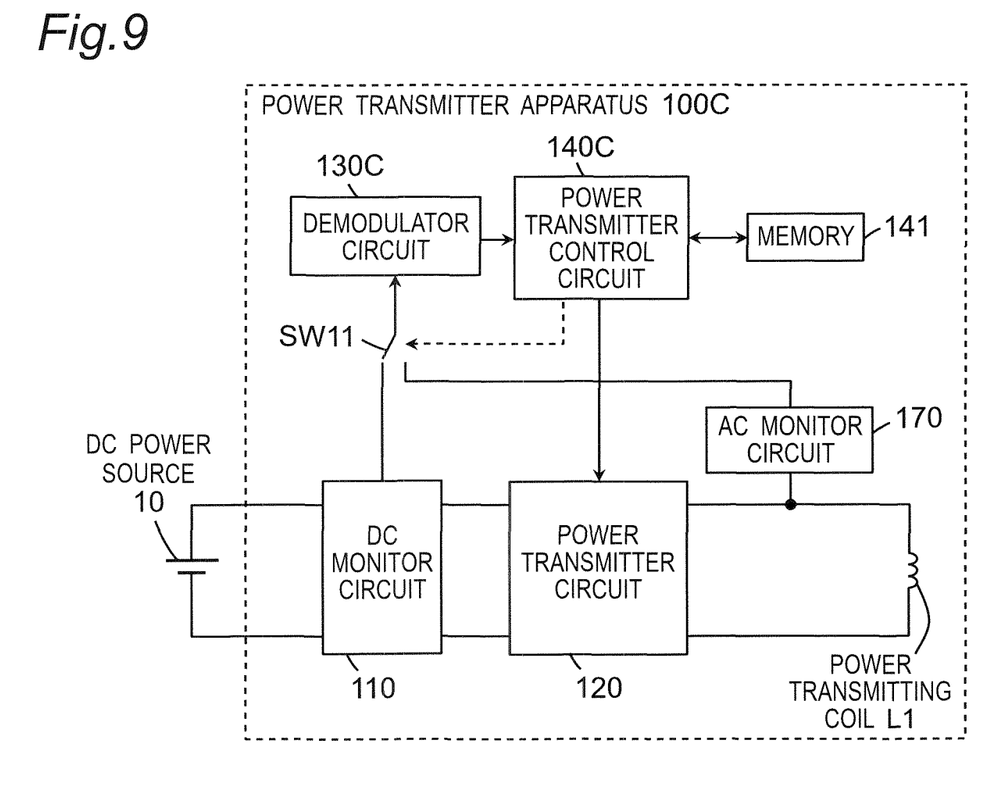
FIG. 9 is a block diagram showing a configuration of a power transmitter apparatus 100C according to a third embodiment.

FIG. 9 is a block diagram showing a configuration of the power transmitter apparatus 100C of the third embodiment. The power transmitter apparatus 100C is provide with a demodulator circuit 130C, a switch SW11, a power transmitter control circuit 140C, and a memory 141, instead of the demodulator circuit 130, the demodulator circuit 180, and the power transmitter control circuit 140B of the power transmitter apparatus 100B of FIG. 7. The switch SW11 sends one of the DC monitor signal and the AC monitor signal to the demodulator circuit 130C under the control of the power transmitter control circuit 140C. When the DC monitor signal is inputted through the switch SW11, the demodulator circuit 130C detects and demodulates a load-modulated signal based on the DC monitor signal to output a first demodulated signal. When the AC monitor signal is inputted through the switch SW11, the demodulator circuit 130C detects and demodulates a load-modulated signal based on the AC monitor signal to output a second demodulated signal. The memory 141 is connected to the power transmitter control circuit 140C, and stores a select bit for selecting one of the DC monitor signal and the AC monitor signal. The power transmitter control circuit 140C executes a monitor signal selecting process of FIG. 10, to turns the switch SW11 so as to send the AC monitor signal to the demodulator circuit 130C when the first demodulated signal is not correctly demodulated, or send the DC monitor signal to the demodulator circuit 130C when the second demodulated signal is not correctly demodulated.

Figure 10:
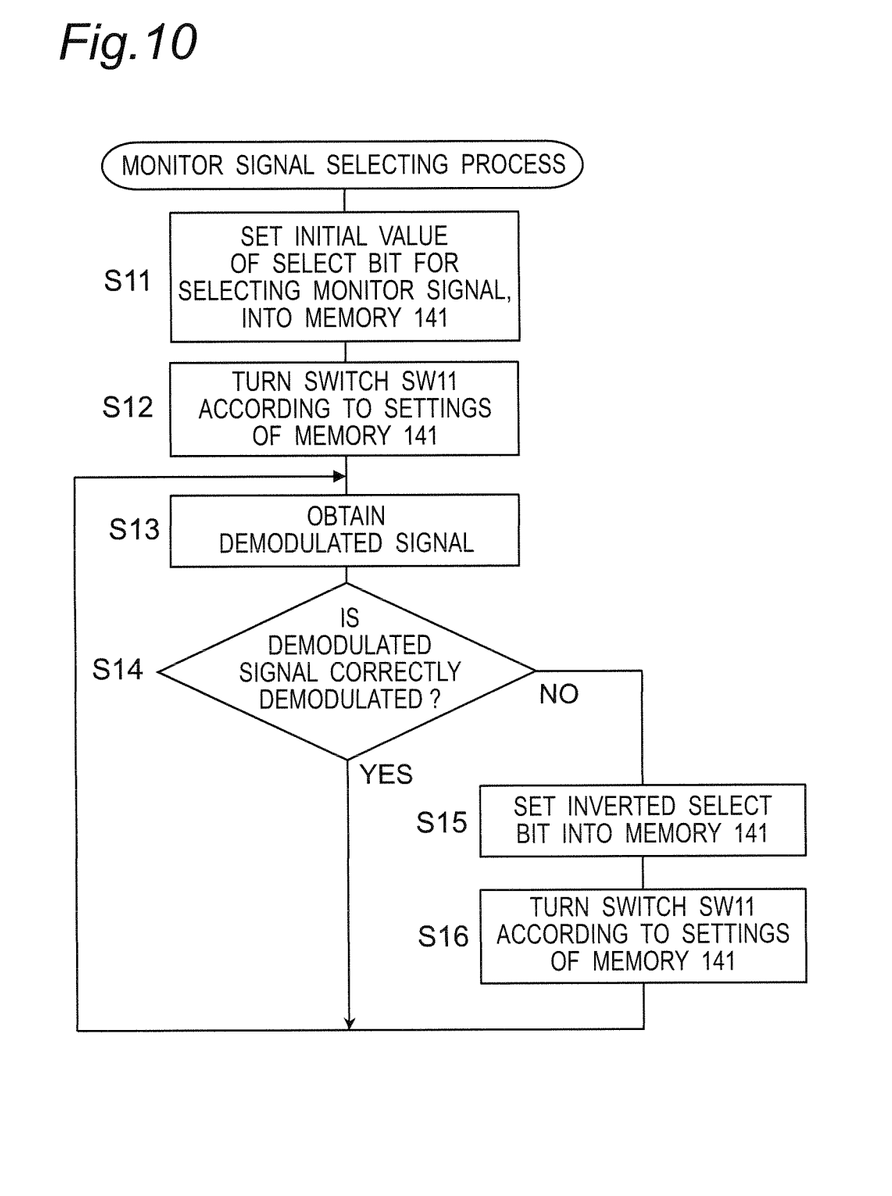
FIG. 10 is a flow chart of a monitor signal selecting process executed by a power transmitter control circuit 140C of FIG. 9.

FIG. 10 is a flow chart of the monitor signal selecting process executed by the power transmitter control circuit 140C of FIG. 9. In step S11, the power transmitter control circuit 140C sets an initial value of the select bit for selecting the DC monitor signal or the AC monitor signal, into the memory 141. The initial value is, for example, a select bit for selecting the DC monitor signal. In step S12, the power transmitter control circuit 140C turns the switch SW11 according to settings of the memory 141. In step S13, the power transmitter control circuit 140C obtains a demodulated signal obtained from the selected DC monitor signal or AC monitor signal. In step S14, the power transmitter control circuit 140C judges whether or not the demodulated signal is correctly demodulated; if YES, the process returns to step S13; if NO, the process proceeds to step S15. For example, when the demodulation has failed for a predetermined consecutive number of times, this failure is defined as the case where the demodulated signal is not correctly demodulated. A checksum is used to judge whether or not the demodulation has been failed. Alternatively, when the demodulation can not be performed for a predetermined time, it may be judged that the demodulated signal is not correctly demodulated. In step S15, the power transmitter control circuit 140C sets an inverted select bit into the memory 141. In step S16, the power transmitter control circuit 140C turns the switch SW11 according to settings of the memory 141.

According to the power transmitter apparatus 100C of FIG. 9, it is possible to monitor both the DC power at the input terminals of the power transmitter circuit 120, and the AC power at the output terminals of the power transmitter circuit 120, and therefore, stably receive the load-modulated signals with fewer errors than those of the power transmitter apparatus 100 of FIG. 1. In addition, according to the power transmitter apparatus 100C of FIG. 9, it is possible to reduce the circuit size as compared to the power transmitter apparatus 100B of FIG. 7, because the demodulator circuit 130C can be shared.

In the above description, the power receiver apparatus transmits the load-modulated signal to the power transmitter apparatus for requesting to increase or decrease the amount of power to be supplied, or the like. However, not limited to the amount of power to be supplied from the power transmitter apparatus, the power receiver apparatus may transmit the load-modulated signal to the power transmitter apparatus for other arbitrary communications.

The wireless power transmitter apparatus and the wireless power supply system of the present disclosure are configured as follows.

A wireless power transmitter apparatus of a first aspect of the present disclosure is a wireless power transmitter apparatus of a wireless power supply system. The wireless power supply system includes the wireless power transmitter apparatus and a wireless power receiver apparatus. The wireless power transmitter apparatus includes a power transmitting coil. The wireless power receiver apparatus includes a power receiving coil and receives an AC power transmitted from the wireless power transmitter apparatus by electromagnetically coupling the power transmitting coil with the power receiving coil. The wireless power transmitter apparatus is provide with: an inverter circuit having input terminals to which a DC power is inputted and output terminals from which the inverter circuit outputs the AC power and which supply the AC power to the power transmitting coil; a DC monitor circuit that monitors the DC power at the input terminals of the inverter circuit, and outputs a DC monitor signal indicating a change in a characteristic associated with the DC power; and a first demodulator circuit that detects a load-modulated signal based on the DC monitor signal, demodulates the load-modulated signal, and outputs a first demodulated signal, the load-modulated signal being transmitted from the wireless power receiver apparatus to the wireless power transmitter apparatus by changing power consumption of the wireless power receiver apparatus.

According to a wireless power transmitter apparatus of a second aspect of the present disclosure, in the wireless power transmitter apparatus of the first aspect, the DC monitor signal indicates a change in a current associated with the DC power.

According to a wireless power transmitter apparatus of a third aspect of the present disclosure, in the wireless power transmitter apparatus of the second aspect, the DC monitor circuit is provided with a resistor connected in series between a power source of the DC power and one of the input terminals of the inverter circuit, and the DC monitor circuit monitors a current flowing through the resistor by measuring a voltage between both ends of the resistor.

According to a wireless power transmitter apparatus of a fourth aspect of the present disclosure, in the wireless power transmitter apparatus of the third aspect, the DC monitor circuit is provided with an amplifier that amplifies the voltage between both ends of the resistor.

According to a wireless power transmitter apparatus of a fifth aspect of the present disclosure, the wireless power transmitter apparatus of any one of the first to fourth aspects is further provide with an impedance converter circuit between the DC monitor circuit and the first demodulator circuit.

According to a wireless power transmitter apparatus of a sixth aspect of the present disclosure, in the wireless power transmitter apparatus of any one of the first to fifth aspects, the wireless power transmitter apparatus is provided with: an AC monitor circuit that monitors the AC power at the output terminals of the inverter circuit, and outputs an AC monitor signal indicating a change in a characteristic associated with the AC power; a second demodulator circuit that detects the load-modulated signal based on the AC monitor signal, demodulates the load-modulated signal, and outputs a second demodulated signal; and a control circuit that judges whether or not at least one of the first and second demodulated signals is correctly demodulated, and that selects one demodulated signal which is correctly demodulated.

According to a wireless power transmitter apparatus of a seventh aspect of the present disclosure, in the wireless power transmitter apparatus of any one of the first to fifth aspects, the wireless power transmitter apparatus is provided with: an AC monitor circuit that monitors the AC power at the output terminals of the inverter circuit, and outputs an AC monitor signal indicating a change in a characteristic associated with the AC power; a switch that sends one of the DC monitor signal and the AC monitor signal to the first demodulator circuit; and a control circuit that controls the switch. When the DC monitor signal is inputted through the switch, the first demodulator circuit detects the load-modulated signal based on the DC monitor signal, demodulates the load-modulated signal, and outputs the first demodulated signal. When the AC monitor signal is inputted through the switch, the first demodulator circuit detects the load-modulated signal based on the AC monitor signal, demodulates the load-modulated signal, and outputs the second demodulated signal. The control circuit turns the switch so as to send the AC monitor signal to the first demodulator circuit when the first demodulated signal is not correctly demodulated, or send the DC monitor signal to the first demodulator circuit when the second demodulated signal is not correctly demodulated.

A wireless power supply system of an eighth aspect of the present disclosure includes the wireless power transmitter apparatus of any one of the first to seventh aspects, and a wireless power receiver apparatus. The wireless power receiver apparatus is provided with: a power receiving coil; and a load modulator circuit that transmits a load-modulated signal from the wireless power receiver apparatus to the wireless power transmitter apparatus by changing power consumption of the wireless power receiver apparatus.

INDUSTRIAL APPLICABILITY

The wireless power transmitter apparatus of the present disclosure can stably receive the load-modulated signals transmitted from the wireless power receiver apparatus, with a few errors. Therefore, according to the wireless power transmitter apparatus of the present disclosure, it is possible to provide a wireless power transmitter apparatus capable of improving a packet read rate without increasing the degree of modulation of the load modulation, and being not affected by the degree of coupling between the coils. The wireless power transmitter apparatus of the present disclosure can be used for, for example, noncontact power supply of a smart phone.

The wireless power transmitter apparatus of the present disclosure can be used not only for an application for charging mobile devices, such as a smart phone, with a small power, but also for a wireless power supply system using the load modulation scheme.

The invention claimed is:

1. A wireless power transmitter apparatus of a wireless power supply system, the wireless power supply system including the wireless power transmitter apparatus and a wireless power receiver apparatus, the wireless power transmitter apparatus including a power transmitting coil, the wireless power receiver apparatus including a power receiving coil and receiving an AC power transmitted from the wireless power transmitter apparatus by electromagnetically coupling the power transmitting coil with the power receiving coil, wherein the wireless power transmitter apparatus comprises:
an inverter circuit comprising input terminals to which a DC power is inputted and output terminals from which the inverter circuit outputs the AC power and which supply the AC power to the power transmitting coil;
a DC monitor circuit that monitors the DC power at the input terminals of the inverter circuit, and outputs a DC monitor signal indicating a change in a characteristic associated with the DC power corresponding to a load-modulated signal associated with a change of power consumption of the wireless power receiver apparatus;
a first demodulator circuit that demodulates the DC monitor signal to a first demodulated signal and outputs the first demodulated signal;
an AC monitor circuit that monitors the AC power at the output terminals of the inverter circuit, and outputs an AC monitor signal indicating a change in a characteristic associated with the AC power corresponding to the load-modulated signal associated with the change of power consumption of the wireless power receiver apparatus;
a second demodulator circuit that demodulates the AC monitor signal to a second demodulated signal and outputs the second demodulated signal; and
a control circuit that judges whether or not at least one of the first and second demodulated signals is correctly demodulated, and that selects one demodulated signal which is correctly demodulated.

2. The wireless power transmitter apparatus as claimed in claim 1,
wherein the control circuit judges whether or not at least one of the first and second demodulated signals is correctly demodulated based on a frequency of error occurrence in the first demodulated signal and a frequency of error occurrence in the second demodulated signal.

3. The wireless power transmitter apparatus as claimed in claim 2,
wherein the frequency of error occurrence in the first demodulated signal and the frequency of error occurrence in the second demodulated signal are respectively obtained by evaluating a checksum signal of the first demodulated signal and a checksum signal of the second demodulated signal.

4. The wireless power transmitter apparatus as claimed in claim 1, further comprising:
an impedance converter circuit between the DC monitor circuit and the first demodulator circuit, the impedance converter circuit having an input impedance higher than that of the first demodulator circuit.

5. A wireless power transmitter apparatus of a wireless power supply system, the wireless power supply system including the wireless power transmitter apparatus and a wireless power receiver apparatus, the wireless power transmitter apparatus including a power transmitting coil, the wireless power receiver apparatus including a power receiving coil and receiving an AC power transmitted from the wireless power transmitter apparatus by electromagnetically coupling the power transmitting coil with the power receiving coil,
wherein the wireless power transmitter apparatus comprises:
an inverter circuit comprising input terminals to which a DC power is inputted and output terminals from which the inverter circuit outputs the AC power and which supply the AC power to the power transmitting coil;
a DC monitor circuit that monitors the DC power at the input terminals of the inverter circuit, and outputs a DC monitor signal indicating a change in a characteristic associated with the DC power corresponding to a load-modulated signal associated with a change of power consumption of the wireless power receiver apparatus,
a first demodulator circuit that demodulates the DC monitor signal to a first demodulated signal and outputs the first demodulated signal;
an AC monitor circuit that monitors the AC power at the output terminals of the inverter circuit, and outputs an AC monitor signal indicating a change in a characteristic associated with the AC power corresponding to the load-modulated signal associated with the change of power consumption of the wireless power receiver apparatus;
a switch that sends one of the DC monitor signal or the AC monitor signal to the first demodulator circuit; and
a control circuit that controls the switch;
wherein, when the DC monitor signal is sent by the switch, the first demodulator circuit demodulates the DC monitor signal to a first demodulated signal,
wherein, when the AC monitor signal is sent by the switch, the first demodulator circuit demodulates the AC monitor signal to a second demodulated signal, and
wherein the control circuit controls the switch so as to cause the switch to send the AC monitor signal to the first demodulator circuit when the first demodulated signal is not correctly demodulated, and to send the DC monitor signal to the first demodulator circuit when the second demodulated signal is not correctly demodulated.

6. A wireless power transmitter apparatus of a wireless power supply system, the wireless power supply system including the wireless power transmitter apparatus and a wireless power receiver apparatus, the wireless power transmitter apparatus including a power transmitting coil, the wireless power receiver apparatus including a power receiving coil and receiving an AC power transmitted from the wireless power transmitter apparatus by electromagnetically coupling the power transmitting coil with the power receiving coil,
wherein the wireless power transmitter apparatus comprises:
an inverter circuit comprising input terminals to which a DC power is inputted and output terminals from which the inverter circuit outputs the AC power and which supply the AC power to the power transmitting coil;
a DC monitor circuit that monitors the DC power at the input terminals of the inverter circuit, and outputs a DC monitor signal indicating a change in a characteristic associated with the DC power; and
a first demodulator circuit that detects a load-modulated signal based on the DC monitor signal, demodulates the load-modulated signal, and outputs a first demodulated signal, the load-modulated signal being transmitted from the wireless power receiver apparatus to the wireless power transmitter apparatus by changing power consumption of the wireless power receiver apparatus,
an AC monitor circuit that monitors the AC power at the output terminals of the inverter circuit, and outputs an AC monitor signal indicating a change in a characteristic associated with the AC power;
a switch that sends one of the DC monitor signal or the AC monitor signal to the first demodulator circuit; and
a control circuit that controls the switch,
wherein, when the DC monitor signal is sent by the switch, the first demodulator circuit detects the load-modulated signal based on the DC monitor signal, demodulates the load-modulated signal, and outputs the first demodulated signal,
wherein, when the AC monitor signal is inputted through the switch, the first demodulator circuit detects the load-modulated signal based on the AC monitor signal, demodulates the load-modulated signal, and outputs the second demodulated signal, and
wherein the control circuit controls the switch so as to cause the switch to send the AC monitor signal to the first demodulator circuit when the first demodulated signal is not correctly demodulated, and to send the DC monitor signal to the first demodulator circuit when the second demodulated signal is not correctly demodulated.

7. A wireless power supply system including a wireless power transmitter apparatus and a wireless power receiver apparatus, the wireless power transmitter apparatus including a power transmitting coil, the wireless power receiver apparatus including a power receiving coil and receiving an AC power transmitted from the wireless power transmitter apparatus by electromagnetically coupling the power transmitting coil with the power receiving coil,
wherein the wireless power transmitter apparatus comprises:

an inverter circuit comprising input terminals to which a DC power is inputted and output terminals from which the inverter circuit outputs the AC power and which supply the AC power to the power transmitting coil;

a DC monitor circuit that monitors the DC power at the input terminals of the inverter circuit, and outputs a DC monitor signal indicating a change in a characteristic associated with the DC power corresponding to a load-modulated signal associated with a change of power consumption of the wireless power receiver apparatus;

a first demodulator circuit that demodulates the DC monitor signal to a first demodulated signal and outputs the first demodulated signal;

an AC monitor circuit that monitors the AC power at the output terminals of the inverter circuit, and outputs an AC monitor signal indicating a change in a characteristic associated with the AC power corresponding to the load-modulated signal associated with the change of power consumption of the wireless power receiver apparatus;

a second demodulator circuit that demodulates the AC monitor signal to a second demodulated signal and outputs the second demodulated signal; and a control circuit that judges whether or not at least one of the first demodulated signal and the second demodulated signal is correctly demodulated, and that selects one demodulated signal that is correctly demodulated, and wherein the wireless power receiver apparatus comprises:

a load modulator circuit that transmits the load-modulated signal from the wireless power receiver apparatus to the wireless power transmitter apparatus by changing power consumption of the wireless power receiver apparatus.

* * * * *